United States Patent
Cheng et al.

(10) Patent No.: US 11,897,447 B2
(45) Date of Patent: Feb. 13, 2024

(54) ITERATIVE SEQUENTIAL VELOCITY AND STATE OF CHARGE SETPOINT SELECTION FOR AUTONOMOUS VEHICLES

(71) Applicant: Ford Global Technologies, LLC, Dearborn, MI (US)

(72) Inventors: Ming Cheng, Northville, MI (US); Bokai Chen, Canton, MI (US); Yousaf Rahman, Ypsilanti, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 397 days.

(21) Appl. No.: 17/108,813

(22) Filed: Dec. 1, 2020

(65) Prior Publication Data
US 2022/0169235 A1 Jun. 2, 2022

(51) Int. Cl.
| | | |
|---|---|---|
| *B60W 20/13* | (2016.01) | |
| *B60W 10/08* | (2006.01) | |
| *B60W 60/00* | (2020.01) | |
| *G01C 21/34* | (2006.01) | |
| *B60W 10/06* | (2006.01) | |

(52) U.S. Cl.
CPC ............ *B60W 20/13* (2016.01); *B60W 10/06* (2013.01); *B60W 10/08* (2013.01); *B60W 60/0023* (2020.02); *G01C 21/3469* (2013.01)

(58) Field of Classification Search
None
See application file for complete search history.

(56) References Cited

U.S. PATENT DOCUMENTS

| | | | |
|---|---|---|---|
| 2009/0093921 A1* | 4/2009 | Falkenstein | B60L 3/12 701/22 |
| 2014/0095003 A1* | 4/2014 | Phillips | B60L 50/16 903/903 |
| 2015/0202990 A1* | 7/2015 | Grossard | G06Q 50/06 701/22 |
| 2017/0008521 A1 | 1/2017 | Braunstein et al. | |
| 2019/0001959 A1* | 1/2019 | Schlumpp | B60W 50/0097 |
| 2019/0016329 A1 | 1/2019 | Park et al. | |
| 2022/0032899 A1* | 2/2022 | Jun | B60K 6/48 |

FOREIGN PATENT DOCUMENTS

WO 2019-136375 A1 7/2019

* cited by examiner

*Primary Examiner* — James J Lee
*Assistant Examiner* — Wenyuan Yang
(74) *Attorney, Agent, or Firm* — David B. Kelley; Brooks Kushman P.C.

(57) ABSTRACT

A method of operating a vehicle includes generating initial state of charge and vehicle velocity profiles for a travel route, for each initial velocity setpoint defining the vehicle velocity profile, generating a plurality of updated state of charge setpoints, for each of the initial velocity setpoints, selecting one of the updated state of charge setpoints to define an updated state of charge profile, for each of the updated state of charge setpoints that defines the updated state of charge profile, generating a plurality of updated velocity setpoints, for each of the updated state of charge setpoints that defines the updated state of charge profile, selecting one of the updated velocity setpoints to define an updated velocity profile, and controlling operation of an electric machine and engine according to the updated state of charge profile and updated velocity profile over the travel route.

10 Claims, 4 Drawing Sheets

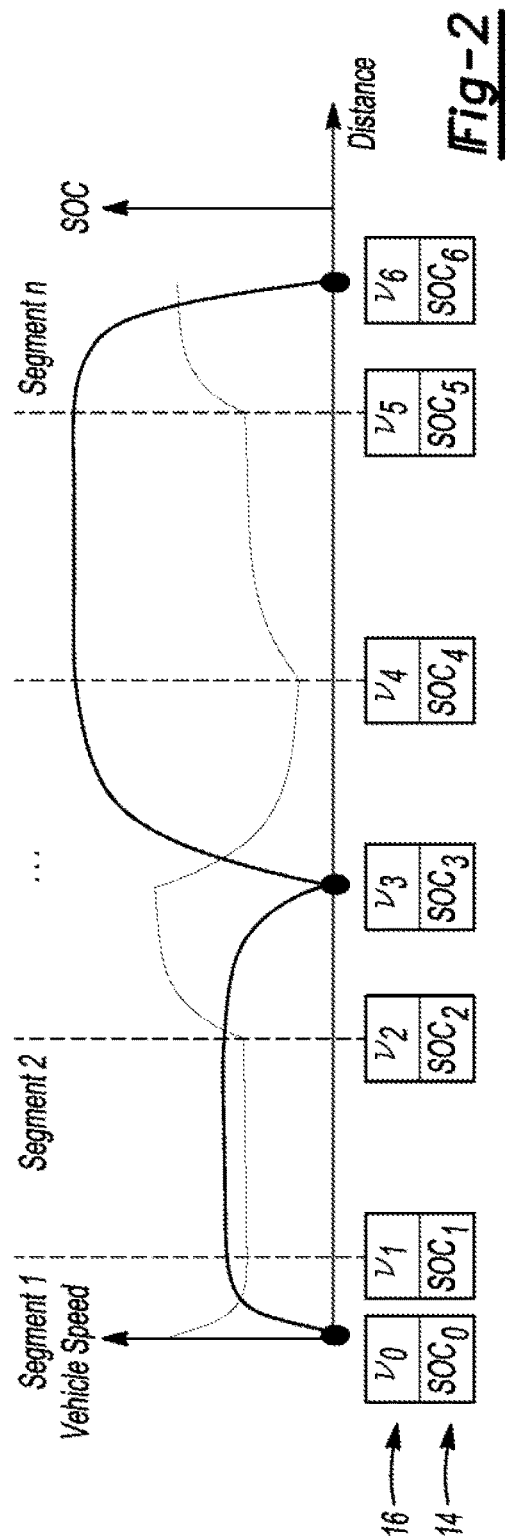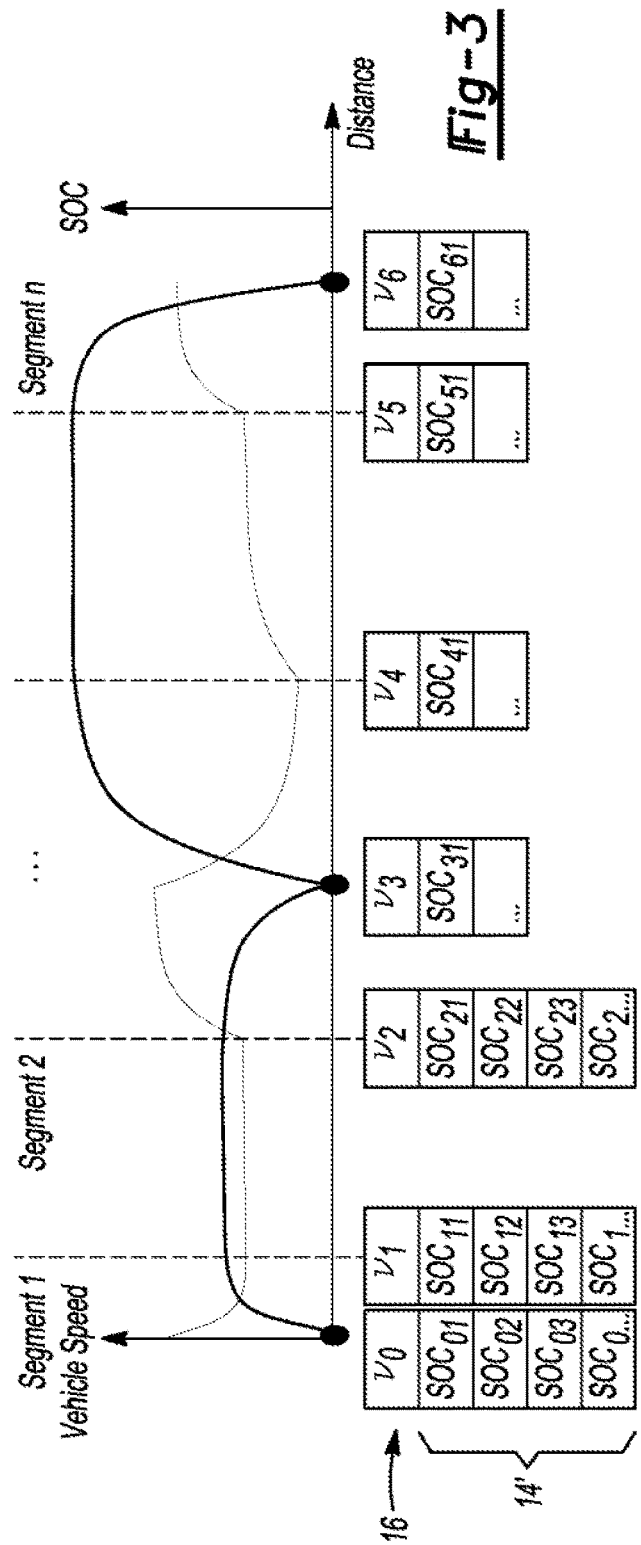

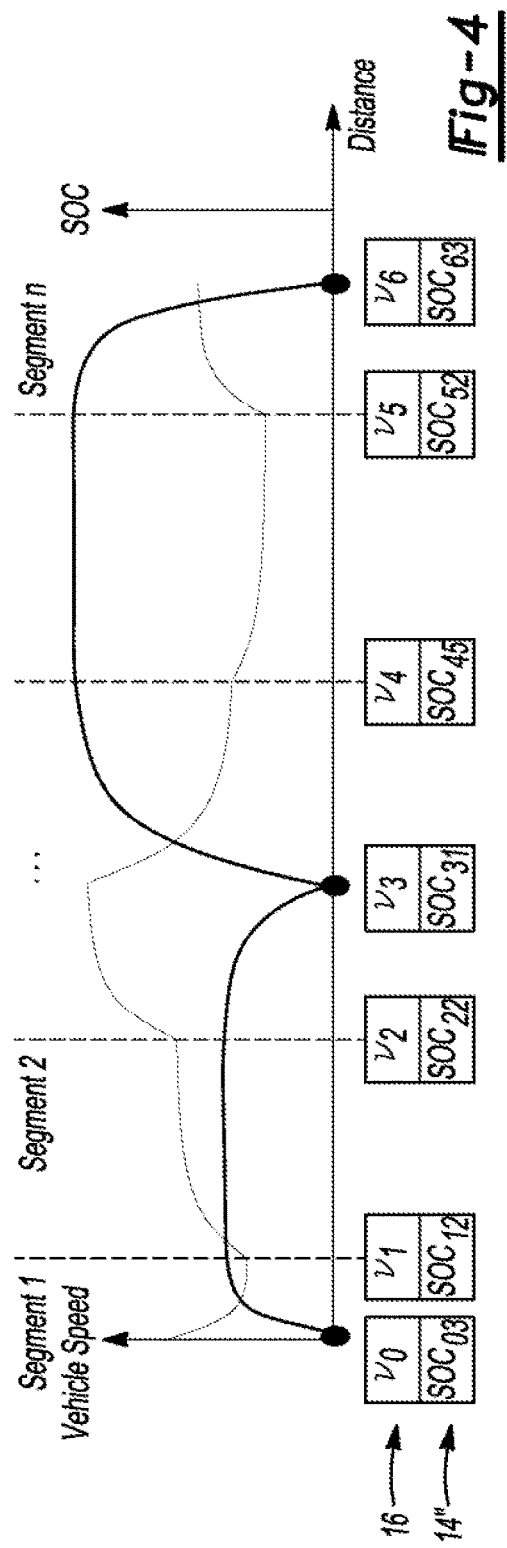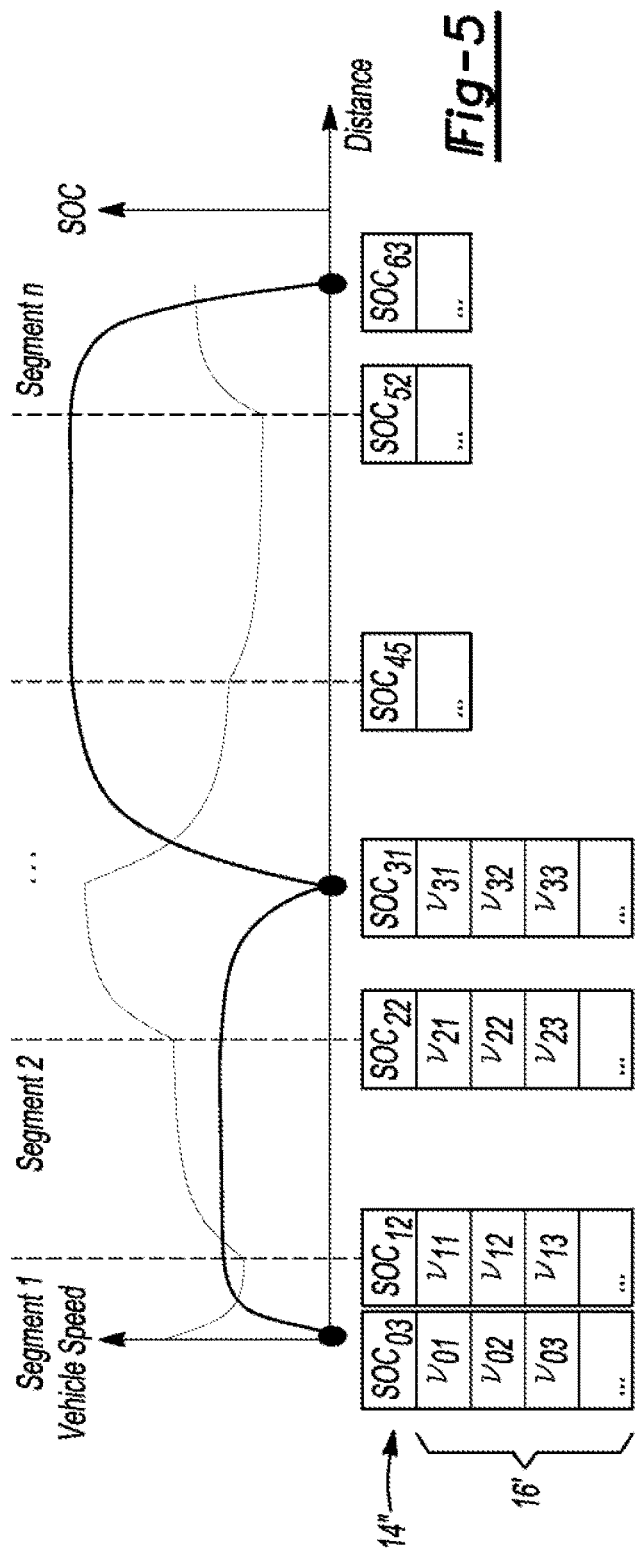

ITERATIVE SEQUENTIAL VELOCITY AND STATE OF CHARGE SETPOINT SELECTION FOR AUTONOMOUS VEHICLES

TECHNICAL FIELD

This disclosure relates to path planning and control for automotive vehicles.

BACKGROUND

Electrified autonomous vehicles may operate along a travel route. Such vehicles may control acceleration, braking, etc. without occupant input.

SUMMARY

An automotive vehicle includes an electric machine, an engine, and one or more controllers. The controllers are programmed to generate initial state of charge and vehicle velocity profiles for a travel route, for each initial velocity setpoint defining the initial vehicle velocity profile, generate a plurality of updated state of charge setpoints that are based on the initial velocity setpoint, for each of the initial velocity setpoints, select one of the updated state of charge setpoints to define an updated state of charge profile, for each of the updated state of charge setpoints that defines the updated state of charge profile, generate a plurality of updated velocity setpoints that are based on the updated state of charge setpoint that defines the updated state of charge profile, for each of the updated state of charge setpoints that defines the updated state of charge profile, select one of the updated velocity setpoints to define an updated velocity profile, and control operation of the electric machine and engine according to the updated state of charge profile and updated velocity profile over the travel route.

A vehicle powertrain control system includes one or more controllers. The controllers are programmed to generate initial state of charge and vehicle velocity profiles for a travel route, for each initial state of charge setpoint defining the initial state of charge profile, generate a plurality of updated velocity setpoints, for each of the initial state of charge setpoints, select one of the updated velocity setpoints to define an updated velocity profile, for each of the updated velocity setpoints that defines the updated velocity profile, generate a plurality of updated state of charge setpoints, for each of the updated velocity setpoints that defines the updated velocity profile, select one of the updated state of charge setpoints to define an updated state of charge profile, and control operation of the electric machine and engine according to the updated state of charge profile and updated velocity profile over the travel mute.

BRIEF DESCRIPTION OF THE DRAWINGS

FIGS. 2 through 6 illustrate velocity and state of charge profiles versus time corresponding to operations of the algorithm of FIG. 1.

DETAILED DESCRIPTION

Figure 1:
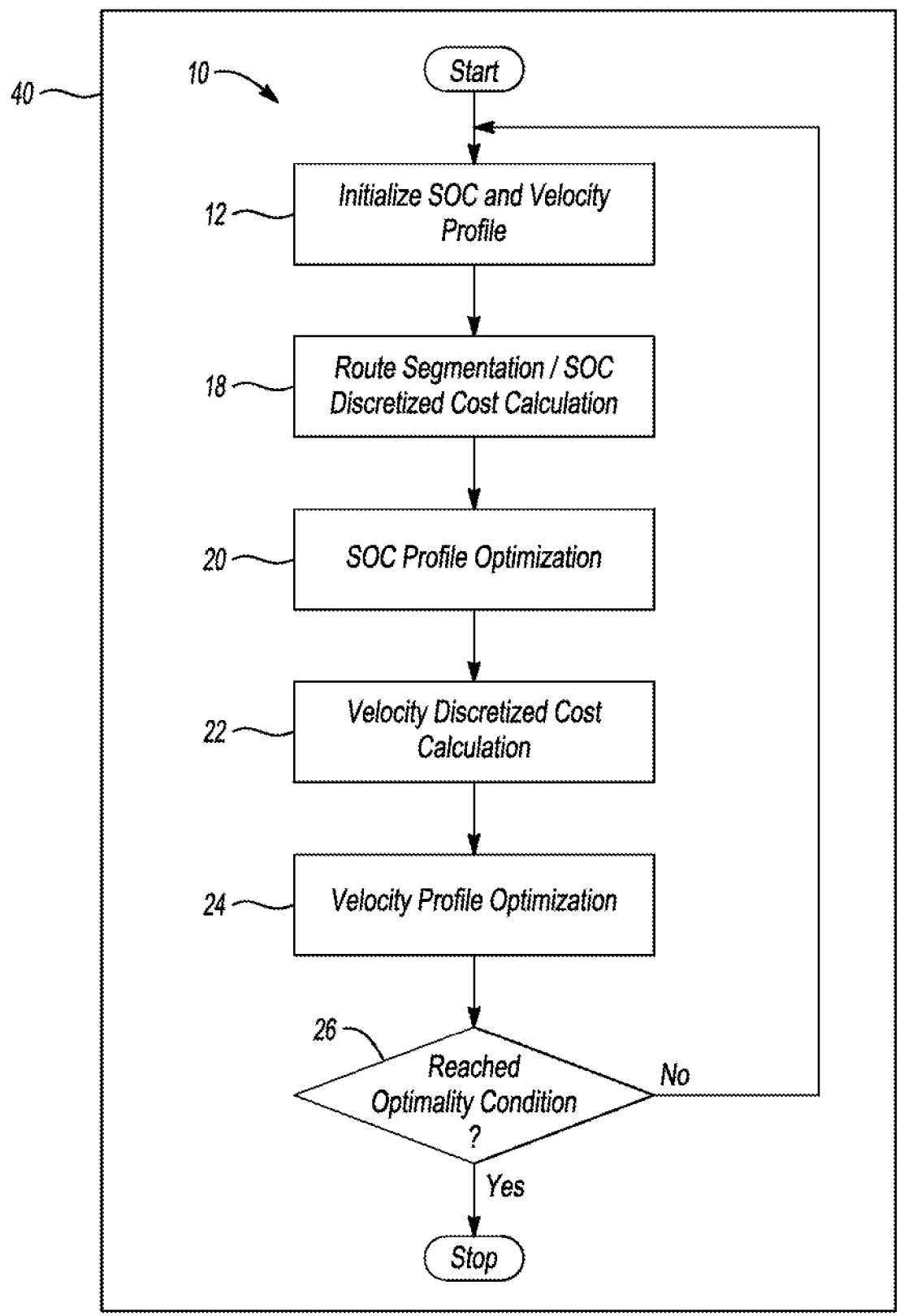
FIG. 1 is a flow chart of an algorithm for developing state of charge and velocity profiles along a route.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Optimization of velocity and state of charge profiles can be performed by a vehicle. Corresponding algorithms should be computationally efficient in terms of time and resources required. Dynamic programming approaches such as Dijkstra's algorithm can be used for simultaneous optimization. Alternatives such as A* searching or genetic algorithms can also be used. Table 1 shows the computational resources required for optimization of a route with 100 waypoints.

TABLE 1

| State of charge Grid | Velocity Grid | Route Grid | Function Evaluations | Data Storage | Time |
|---|---|---|---|---|---|
| 20 | 40 | 100 | 64,00,000 | 500 GB | ~4 hr. |

The table shows that simultaneous optimization using these approaches may be too computationally expensive for online computation of the optimal velocity and state of charge profiles. Other approaches may use Pontryagin's Minimum Principle to determine the optimal trajectory analytically. Such an approach, however, requires a simplified model of the system, which may not be sufficient to accurately predict the fuel consumption and may result in sub-optimal or impractical trajectories.

While state of charge set points have conventionally been determined as part of path forecasting for electrified vehicles, autonomous vehicles also allow for the control of velocity along a given route. That is, an autonomous vehicle can control its state of charge and velocity along a route, in a way not possible when a driver dictates vehicle speed, to achieve various objectives including the minimization of energy consumption.

A variety of known techniques including graph search methods and Markov decision processes are available for segmenting a route to be travelled according to road type, road grade, speed limits, etc. And, various inputs such as traffic density, traffic light state and location, defined electric only zones, etc. can be used to inform these known strategies (graph search methods, Markov decision processes, etc.) for selecting initial state of charge setpoints for each segment independent of velocity. Likewise, various inputs such as speed limit, road type, traffic density, etc. can be used to inform various known strategies (graph search methods, Markov decision processes, etc.) for selecting velocity setpoints for each segment independent of state of charge. (Because graph search methods, Markov decision processes, etc. are well known, further discussion of same is not necessary.) Opportunity exists, however, to co-refine these setpoints to improve energy consumption as mentioned above.

FIG. 1 is a flow chart 10 of an algorithm for co-optimizing velocity and state of charge set points along a route to be travelled by an autonomous vehicle. Several operations are shown. Each will be discussed in detail with further reference to FIGS. 2 through 6.

With reference to FIGS. 1 and 2, at operation 12 a given route is segmented using known techniques, and initial state of charge setpoints 14 and velocity setpoints 16 along the segments are established using known techniques, such as those mentioned above. Again, the initial state of charge setpoints 14 are independent of velocity information and the initial velocity setpoints 16 are independent of state of charge information. Seven setpoint values for state of charge and velocity are shown for ease of understanding. In actual implementations, hundreds or thousands of such values may be used to define the initial profiles.

With reference to FIGS. 1 and 3, at operation 18, the velocity setpoints 16 are assumed to be constant and, for each one of the velocity setpoints 16, a corresponding set of possible state of charge set points 14' is generated by discretizing the state of charge profile in increments in the vicinity of the initial state of charge profile. For example, if the value of the state of charge setpoint SOC1 is 70%, ten values less than 70% are generated in 2% increments (68%, 66%, 64%, etc.), and ten values greater than 70% are generated in 2% increments (72%, 74%, 76%, etc.). A number of values other than ten (e.g., 5, 15, etc.) and increments other than 2% (e.g., 1%, 3%, etc.) can of course be used.

With reference FIGS. 1 and 4, at operation 20, for each of the velocity setpoints 16, one of the set of possible state of charge setpoints 14' is selected using known techniques, for example, dynamic programming or Pontrayagin's minimum principle such that improved state of charge setpoints 14" are identified. The improved state of charge setpoints 14", which form an updated state of charge profile, yield an improvement in energy consumption as compared with the initial state of charge profile 14 as the charge points are optimized for the entire velocity profile, with future velocity profile information used to perform the optimization (i.e. dynamic programming). Typically, optimal control techniques such as model predictive control optimize the energy consumption over a short horizon (typically on the order of several seconds). In both cases, the goal of the optimization is to minimize energy usage of the electrified powertrain. However, utilizing the entire future state of charge profile allows for the velocity profile to be optimized for the entire trip, yielding benefits to fuel economy compared to techniques that only optimize for a short horizon.

With reference FIGS. 1 and 5, at operation 22, the state of charge setpoints 14" are assumed to be constant and, for each one of the state of charge setpoints 14", a corresponding set of possible velocity set points 16' is generated by discretizing the velocity profile in increments in the vicinity of the initial state of charge profile using a process similar to that described with reference to operation 18.

Figure 6:
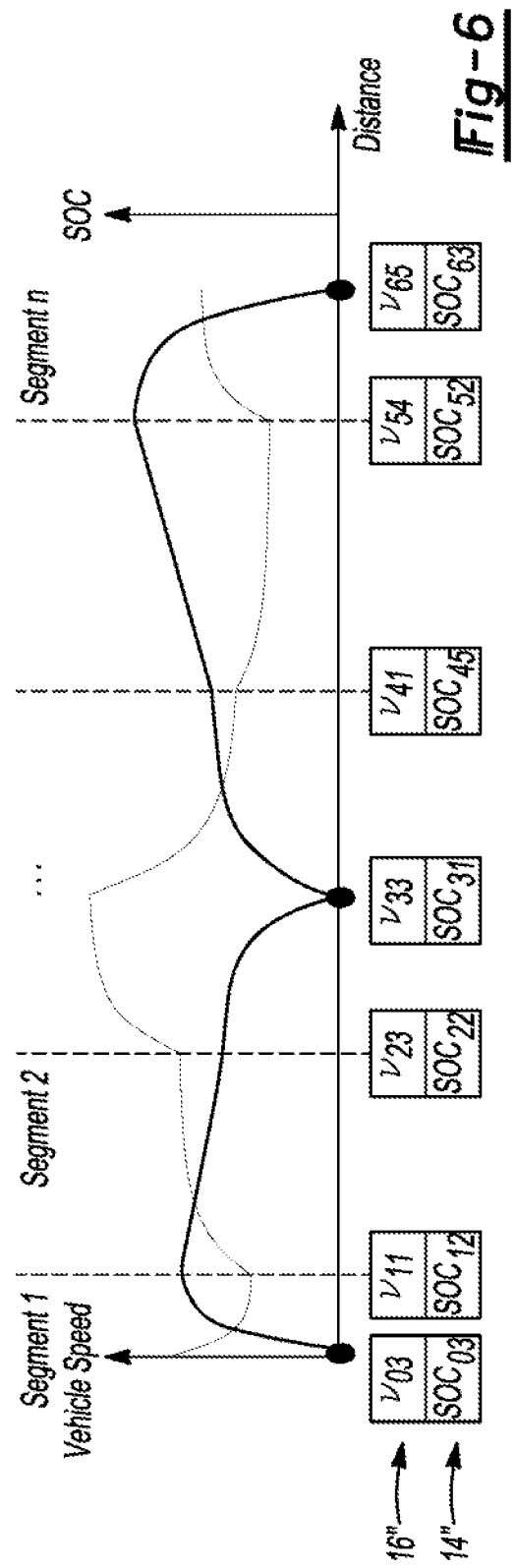

With reference FIGS. 1 and 6, at operation 24, for each of the updated state of charge setpoints 14", one of the set of possible voltage setpoints 16' is selected using, for example, dynamic programming or Pontrayagin's minimum principle such that improved velocity setpoints 16" are identified. The improved velocity setpoints 16", which form an updated velocity profile, yield an improvement in energy consumption as compared with the initial velocity profile 16 as the velocity set points 16' are optimized for the entire state of charge profile, with future state of charge profile information used to perform the optimization (i.e. dynamic programming).

With reference FIGS. 1, 2, and 6, at operation 26, a comparison between the initial state of charge setpoints 14 and velocity setpoints 16 and the updated state of charge setpoints 14" and velocity setpoints 16" is performed to determine whether respective differences between the same exceed some predefined threshold. For example, if the values that define the velocity setpoints 16" are within 10% of the corresponding values that define the velocity setpoints 16, the algorithm will end. Otherwise, the co-optimization will be deemed as not complete and the algorithm 10 will return to operation 18 for further iterations using the updated state of charge setpoints 14" and velocity setpoints 16" as starting points.

Figure 7:
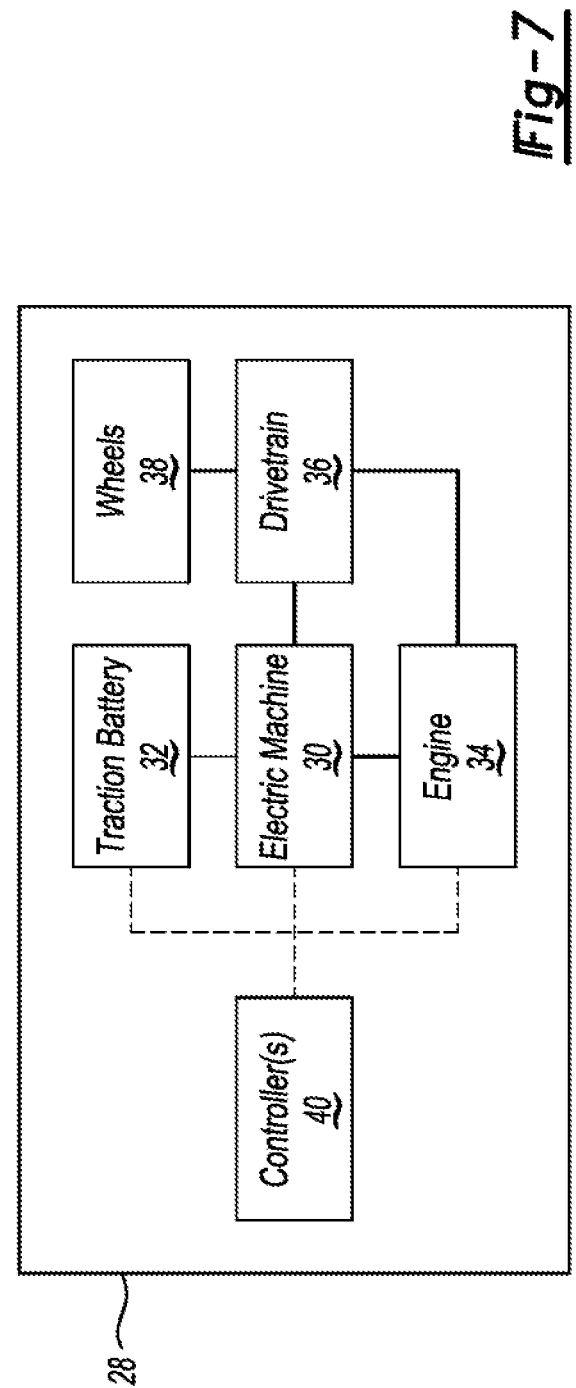
FIG. 7 is a block diagram of a vehicle.

With reference to FIG. 7, a vehicle 28 includes an electric machine 30, a traction battery 32, an engine 34, a drivetrain 36, wheels 38, and one or more controllers 40. The drivetrain 36 is mechanically coupled with the electric machine 30, engine 34, and wheels 38 such that mechanical power from the electric machine 30 and/or engine 34 can drive the wheels 38. The electric machine 30 is electrically coupled with the traction battery 32 such that electric power may be exchanged between the two. The engine 34 is mechanically coupled with the electric machine 30 such that operation of the engine 34 may mechanically power the electric machine 30 to generate electric power for storage by the traction battery 32. The one or more controllers 40 are in communication with/control the electric machine 30, traction battery 32, and engine 34, and may implement the algorithms contemplated herein to determine the velocity and state of charge profiles at which to operate the vehicle 28 over a given route. The controllers 40 may, for example, control the electric machine 30 and engine 34 to ensure sufficient mechanical power is delivered to the drivetrain 36 as known in the art to ensure the vehicle 28 adheres to the determined velocity profile. If for a given segment the velocity setpoint is 35 miles per hour, the controllers 40 may operate the electric machine 30 and engine 34 in known fashion to ensure the vehicle 28 travels at 35 miles per hour. Likewise, the controllers 40 may control the electric machine 30 and engine 34 to ensure electric power is consumed/generated as known in the art consistent with the state of charge profile. If for a given segment the state of charge setpoint is 75% and the current state of charge is 70%, the controllers 40 may operate the engine 34 to run the electric machine 30 in known fashion to charge the traction battery 32, etc.

More generally, the vehicle may be a hybrid or power-split vehicle, etc. As such the vehicle may have a mechanical power source, an electrical power source, an electrical bus network, a generator, an inverter, a rectifier, additional sources of energy producers and consumers, and a controller. The mechanical power source may be an internal combustion engine. The electric power source may be a traction battery. Additional energy producers and consumers may be wheels of the vehicle. The power sources may be in at least one of mechanical and electro-magnetic communication. Communication between the power sources may facilitate energy delivery and storage. For example, the mechanical power source may deliver mechanical force such that resulting energy is stored in the battery. Alternatively, the additional energy producers and consumers may deliver mechanical force such that the resulting is stored in the battery. Communication between the power sources may be facilitated using the electrical generator, inverter, and rectifier.

The vehicle may also be autonomous. As such, the controller may request specific operations of the vehicle. The controller may monitor and request modification of the engine speed, the battery power, and the vehicle speed. The controller may be programmed to request modification of a single, or combination of the monitored values to increase energy efficiency. For example, the controller my request the engine speed to increase. Alternatively, the controller may request more battery power be delivered to the bus network and an increase in the vehicle speed. Engine speed modification may be subject to physical limitations of the engine. Battery power modification may be subject to physical limitations of the vehicle electrical system. Vehicle speed modification may be subject to physical limitation of the vehicle. Further, vehicle speed modification may be subject to legal restrictions. For example, the controller may be programmed to inhibit vehicle speed modification that may result in velocity exceeding a local speed limit.

The controller may contain a program for optimizing energy management using three degrees of freedom. The three degrees of freedom may be engine speed, battery state of charge, and vehicle speed. The controller may produce optimized state of charge and velocity profiles separate from optimizing engine speed. Production of the optimized state of charge and velocity may be performed iteratively.

The controller may produce initial state of charge and velocity profiles in response to reception of offline path information. For example, the controller may be initialized upon reception of a new destination request. The state of charge and velocity profiles may consider distance of desired path, elevation differentials of desired path, current battery state of charge, and velocity regulation limitations of desired path. The state of charge and velocity profiles may further consider previous trips, manufacturer specification of the vehicle, etc.

Upon completion of initial state of charge and velocity profiles, the controller may produce a segmented route with offline path information. The controller may produce a discretized state of charge profile along the segmented route using the initial state of charge profile. The controller may produce a refined state of charge profile by optimizing the discretized state of charge profile. Optimization of the discretized state of charge profile may include a comparison to the initial velocity profile along the segmented route. The controller may produce a discretized velocity profile along the segmented route using the initial velocity profile. The controller may produce a refined velocity profile by optimizing the discretized velocity evaluation. Optimization of the discretized velocity may include comparison to the refined state of charge profile.

Upon completion of refining the initial state of charge and velocity profiles, the controller may compare the initial state of charge and velocity profiles to the refined state of charge and velocity profiles. The controller may determine that the refined state of charge and velocity profiles are optimized if the estimated energy expense differential between the refined profiles and the initial profiles is within a predetermined threshold. Upon determining the estimated energy expense differential is greater than the predetermined threshold, the controller may return to the route segmentation procedure, and repeat refining previously refined state of charge and velocity profiles.

In alternate embodiments, the controller may refine a velocity profile before refining a state of charge profile. Other embodiments may alternate refining order during repetitions. Alternation of refining order may follow a pattern or may be randomized. Refinement of the velocity and state of charge profiles may be performed intermittently or real time. Refinement may be done on board the vehicle or in a remote location.

The vehicle may use a virtual driver system for longitudinal planning. The virtual driver system may comprise a speed limiter, a path refiner, and a path follower.

The speed limiter may receive or contain offline path information regarding routes between desired locations. The speed limiter may further contain traffic information relevant to the routes between desired locations. The traffic information may be used to discover the fastest or safest route between locations. Further, the route information may be used to construct a prediction of the likely velocity parameters of the vehicle. For instance, the speed limiter may predict the vehicle traveling a speed near 70 miles per hour when travel on an interstate highway is routed. The speed limiter may produce a spatial profile.

The path refiner may receive the path information from the speed limiter. The information may be the spatial profile indicative of a path spatial preview. The spatial profile may consist of a 100-200 kilometer preview. The path refiner may further receive perception information. The path refiner may produce a temporal profile.

The path follower may receive the path information from the path refiner. The information may be the temporal profile. The path follower may further receive optimization information from the controller. The optimization information may be the velocity profile. The velocity profile may consist of an 8-10 kilometer preview. The path finder may produce a driver torque request. The driver torque request may be compared with the vehicle speed to produce a driver power request.

The controller may contain a battery power request arbitration program. The arbitration program may receive the driver torque request, the vehicle speed, the battery state of charge, and the desired battery state of charge. The arbitration program may produce a battery power request.

The vehicle may contain a system for energy management. The system may optimize energy management using one degree of freedom. The system may receive the driver power request. The system may also receive the battery power request. The system may compare the driver and battery power request values and produce an engine power request. The system may optimize energy using the energy power request and the current vehicle speed, producing an engine speed command. The engine speed command may be used to modify engine speed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. In the example of FIGS. 1-6, the velocity profile was first assumed to be constant, then state of charge. In other examples, the state of charge profile can be assumed to be constant, then velocity, etc.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive vehicle comprising:
   an electric machine;
   an engine; and
   one or more controllers programmed to
   a) generate an initial state of charge profile and an initial vehicle velocity profile for a travel route,
   b) for each initial velocity setpoint defining the initial vehicle velocity profile, generate a plurality of updated state of charge setpoints,
   c) for each of the initial velocity setpoints, select one of the updated state of charge setpoints to define an updated state of charge profile,
   d) for each of the updated state of charge setpoints that defines the updated state of charge profile, generate a plurality of updated velocity setpoints,
   e) for each of the updated state of charge setpoints that defines the updated state of charge profile, select one of the updated velocity setpoints to define an updated velocity profile, and
   f) control operation of the electric machine and engine according to the updated state of charge profile and updated velocity profile over the travel route to drive actual state of charge and velocity values toward corresponding ones of the updated state of charge setpoints and updated velocity setpoints.

2. The automotive vehicle of claim 1, wherein the one or more controllers are further programmed to repeat operations a) through e) until values of the updated state of charge setpoints fall within a predefined range.

3. The automotive vehicle of claim 2, wherein the predefined range is defined by output from a previous iteration of operations a) through e).

4. The automotive vehicle of claim 1, wherein the one or more controllers are further programmed to repeat operations a) through e) until values of the updated velocity setpoints fall within a predefined range.

5. The automotive vehicle of claim 4, wherein the predefined range is defined by output from a previous iteration of operations a) through e).

6. A method of operating a vehicle including an electric machine and engine, the method comprising:
   a) generating an initial state of charge profile and an initial vehicle velocity profile for a travel route;
   b) for each initial velocity setpoint defining the vehicle velocity profile, generating a plurality of updated state of charge setpoints;
   c) for each of the initial velocity setpoints, selecting one of the updated state of charge setpoints to define an updated state of charge profile;
   d) for each of the updated state of charge setpoints that defines the updated state of charge profile, generating a plurality of updated velocity setpoints;
   e) for each of the updated state of charge setpoints that defines the updated state of charge profile, selecting one of the updated velocity setpoints to define an updated velocity profile; and
   f) controlling operation of the electric machine and engine according to the updated state of charge profile and updated velocity profile over the travel route to drive actual state of charge and velocity values toward corresponding ones of the updated state of charge setpoints and updated velocity setpoints.

7. The method of claim 6 further comprising repeating operations a) through e) until values of the updated state of charge setpoints fall within a predefined range.

8. The method of claim 7, wherein the predefined range is defined by output from a previous iteration of operations a) through e).

9. The method of claim 6 further comprising repeating operations a) through e) until values of the updated velocity setpoints fall within a predefined range.

10. The method of claim 9, wherein the predefined range is defined by output from a previous iteration of operations a) through e).

* * * * *